United States Patent Office 2,797,982
Patented July 2, 1957

2,797,982

AMMONIUM CHLORIDE

William Peter McKinney, Northwich, England, assignor to Imperial Chemical Industries Limited, a corporation of Great Britain No Drawing. Application June 29, 1954,
Serial No. 440,284

Claims priority, application Great Britain July 3, 1953

6 Claims. (Cl. 23—100)

This invention relates to ammonium chloride compositions that are free-flowing and do not cake on storage.

It is well known that ammonium chloride crystals have a strong tendency to cake and exhibit poor free-flowing properties. On storage, it is no uncommon thing to find a week or two after packing into bags that the contents of a bag have caked into one solid lump. Even when freshly made the material cannot be said to be free-flowing. Caking occurs even when bags stand individually in a store; if stacked one on top of the other the resulting compression aggravates it.

Caked ammonium chloride creates difficulties in handling and distributing for all users of the material but they are especially felt in galvanising, which provides one of the largest uses for ammonium chloride, where it is usual to scatter the crystals in a thin layer over the surface of the molten zinc.

When small crystals of a salt such as ammonium chloride are exposed to a damp atmosphere a layer of water is quickly adsorbed around the crystals and forms a saturated solution. This makes the crystals sticky and as a result they do not flow easily. If they are now exposed to a drier atmosphere some of the solution may evaporate and crystallise, and the new crystals will act as a bond to cement the others together. This causes hard lumps to form. One could prevent much of this happening by keeping the material in impermeable packages but such would be too expensive for general use. A better way to solve the problem is to mix the material with a small proportion of a suitable additive.

Broadly there are three types of additive. One type, of which calcium hydroxyphosphate is an example, acts as a sponge for water and thus prevents the formation of films of solution round the crystals. Such additives keep a salt free-flowing and non-caking so long as they themselves remain unsaturated with water. Additives of the second type, among which are certain dyes, for example "acid magenta," prevent the formation of cakes by exerting an effect on the crystallisation process. The additive dissolves in the layer of solution round the crystals, and either stops the solution from crystallising when it becomes supersaturated as atmospheric conditions change, or alters the mode of crystallisation so that at worst only weak bonds are formed between crystals. The third type of additive has waterproofing effects. For example, crystals of certain materials have been coated with paraffin wax or stearic acid to give a water-repellent layer.

None of these three types of additive has so far been found to have much lasting effect in reducing the caking of ammonium chloride. We have found however that certain surface-active agents have a pronounced and lasting effect in preventing ammonium chloride from caking and in keeping it free-flowing.

According to this invention we provide free-flowing, non-caking ammonium chloride compositions which contain at least 96.0% by weight of ammonium chloride and between 0.01% and 0.05% by weight of a water-soluble salt of a long chain alkylamine or of the sodium salt of a long chain alkyl-aryl sulphonic acid, containing at least 8 carbon atoms in the alkyl chain.

Such compositions can remain much longer in storage without serious caking than can ammonium chloride alone, and if lumps do form they are of a type that is readily broken down in the hands. These ammonium chloride compositions have also good free-flowing properties, and this effect of the surface-active agent is possibly distinct from its effect in preventing caking because untreated ammonium chloride, even when so freshly made as not to have had time to cake, is not genuinely free-flowing.

The preferred salts of long chain alkylamines are octadecylamine acetate and octadecylamine hydrochloride, and the preferred sodium salts of long chain alkyl-aryl sulphonic acids are sodium decyl benzene sulphonate and sodium dodecyl benzene sulphonate. A convenient method for mixing the surface-active agent with the ammonium chloride is to dissolve the former in a small quantity of water and to mix the resulting solution with the ammonium chloride crystals in a mixer of conventional design. The quantity of water ought clearly to be less than what would of itself cause caking of the ammonium chloride if the latter has already been dried. On the other hand, in a process for manufacturing ammonium chloride the solution of surface-active agent can be added to undried crystals just before they are due to pass to driers, and then the quantity of water in the solution is not so critical. For surface-active agents of the type described to exert their greatest effect in preventing caking and keeping ammonium chloride free-flowing, the latter ought to be dried to a moisture content of the order of 0.005%. At moisture contents of the order of 0.02% and higher their effect, though still considerable, is less than what it is at the lower moisture contents. It is not yet clear how these surface-active agents function in preventing caking. It may be that they act by reducing the surface tension of any layers of solution round the crystals, or by reducing the interfacial tension between solution and crystal, whereby attractive forces between the crystals are diminished.

Example 1

On a laboratory scale, 100 gramme samples of ammonium chloride were mixed each with a 1% solution of an additive to give samples that after drying contained 0.05% of additive and less than 0.005% of water. About forty different additives were tested. The caking tendencies of these samples were measured in a machine consisting of a cylindrical mould through which wet and dry air could be passed alternately. A loaded piston sliding in the mould applied pressure to the sample and produced a cake. The cake was transferred to a penetrometer consisting essentially of a needle arranged to rest with its point in contact with the cake and able to be loaded with weights until it penetrates the cake—the harder the cake the bigger the load. The load on the piston was chosen to exert a pressure of 15 lbs./square inch, which is equivalent to the pressure on the bottom layers of ammonium chloride in a silo filled to a depth of 30 feet. It was found possible only with very great difficulty to prepare a cake of ammonium chloride to which octadecylamine acetate had been added, and even when prepared the cake collapsed under the slightest pressure. No other additive was found to have a superior effect but octadecylamine hydrochloride was equally good. Results obtained with a few of the additives are given in the following table,

| Additive | Percent Moisture | Weight on penetrometer needle required to break the cake |
|---|---|---|
| none | not detected | 930 grammes. |
| 0.05% octadecylamine acetate | 0.002 | nil—did not cake. |
| 0.05% octadecylamine hydrochloride | 0.002 | Do. |
| 0.05% sodium decyl benzene sulphonate | 0.001 | 90 grammes. |
| 0.05% sodium dodecyl benzene sulphonate | 0.001 | 110 grammes. |
| 0.05% potassium palmitate | not detected | 175 grammes. |
| 0.05% phthalic anhydride | 0.002 | 188 grammes. |
| 0.05% potassium hydrogen tartrate | not detected | 207 grammes. |
| 0.05% chestnut tannin | 0.001 | 521 grammes. |

Most of the other additives tried needed weights of between 200 and 500 grammes to break the cake.

*Example 2*

On a plant scale approximately 2 litres of a 5% solution of octadecylamine acetate at a temperature of 60°–70° C. were sprayed on to a quantity of about 4 cwts. of ammonium chloride from which as much moisture as possible had been removed by centrifuging. Octadecylamine acetate is virtually insoluble in water below about 25° C. and was therefore deposited on the surface of the centrifuge cake when the temperature fell below this. During discharge from the centrifuge and passage through the driers of the ammonium chloride the additive became uniformly distributed in a proportion of 0.04–0.05%. Some of the ammonium chloride treated in this way was dried to a water content of 0.02% and packed partly in unlined 1 cwt. hessian bags, partly in 1 cwt. five-ply paper bags which were stored in an ordinary warehouse, each bag being arranged to be under the pressure of four others. After four weeks the moisture content had increased to 0.06%; the contents of the bags were substantially uncaked, showing in fact only a few small lumps easily broken by thumb and finger pressure to give a free-flowing material. Untreated ammonium chloride of the same moisture content packed and stored under the same conditions had formed into hard, very large lumps, so large that the bag as a whole appeared to be solid, and too hard to be broken in the hands, after the same time.

Another quantity of the treated ammonium chloride was dried to a moisture content of 0.007% and packed and stored in the same way. After 4 weeks the moisture content had increased to 0.04% but the contents of the bags were uncaked and free-flowing. Untreated ammonium chloride of the same initial moisture content packed and stored under the same conditions had formed into large, hard lumps after the same time.

What I claim is:

1. A free-flowing, non-caking composition containing at least 96.0% by weight of ammonium chloride and between 0.01% and 0.05% by weight of a member of the group consisting of a water-soluble salt of a long chain alkylamine and a sodium salt of a long chain alkyl-aryl sulphonic acid, said long chain alkylamine and said long chain alkylaryl sulphonic acid both containing at least 8 carbon atoms in the alkyl chain.

2. A free-flowing, non-caking composition as claimed in claim 1 in which the water-soluble salt of a long chain alkylamine containing at least 8 carbon atoms in the alkyl chain is a salt of octadecylamine.

3. A free-flowing, non-caking composition as claimed in claim 1 in which the water-soluble salt of a long chain alkylamine containing at least 8 carbon atoms in the alkyl chain is octadecylamine acetate.

4. A free-flowing, non-caking composition as claimed in claim 1 in which the sodium salt of a long chain alkyl-aryl sulphonic acid containing at least eight carbon atoms in the alkyl chain is sodium decyl benzene sulphonate.

5. A free-flowing, non-caking composition as claimed in claim 1 in which the water-soluble salt of a long chain alkylamine containing at least 8 carbon atoms in the alkyl chain is octadecylamine hydrochloride.

6. A free-flowing, non-caking composition as claimed in claim 1 in which the sodium salt of a long chain alkyl-aryl sulphonic acid containing at least eight carbon atoms in the alkyl chain is sodium dodecyl benzene sulphonate.

References Cited in the file of this patent

UNITED STATES PATENTS

| | | |
|---|---|---|
| 1,836,048 | Somerville | Dec. 15, 1931 |
| 2,222,945 | Groll | Nov. 26, 1940 |
| 2,631,980 | Lewis | Mar. 17, 1953 |